United States Patent
Trivedi

(10) Patent No.: US 11,788,016 B2
(45) Date of Patent: Oct. 17, 2023

(54) METHODS AND SYSTEMS FOR HYDRODEOXYGENATING BIO-DERIVED FEEDSTOCKS AND GENERATING RENEWABLE POWER

(71) Applicant: EXXONMOBIL TECHNOLOGY AND ENGINEERING COMPANY, Annandale, NJ (US)

(72) Inventor: Kirtan K. Trivedi, Annandale, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 18/172,586

(22) Filed: Feb. 22, 2023

(65) Prior Publication Data

US 2023/0272289 A1 Aug. 31, 2023

Related U.S. Application Data

(60) Provisional application No. 63/313,977, filed on Feb. 25, 2022.

(51) Int. Cl.
*C10G 3/00* (2006.01)
(52) U.S. Cl.
CPC ............... *C10G 3/54* (2013.01); *C10G 3/46* (2013.01); *C10G 2300/1014* (2013.01); *C10G 2400/04* (2013.01)

(58) Field of Classification Search
CPC .... C10G 3/54; C10G 3/46; C10G 2300/1014; C10G 2400/04
See application file for complete search history.

(56) References Cited

U.S. PATENT DOCUMENTS

| | | | |
|---|---|---|---|
| 2017/0226695 A1* | 8/2017 | Rowlands | C10G 1/10 |
| 2020/0040259 A1* | 2/2020 | Scoggins | C10K 1/024 |
| 2021/0054292 A1* | 2/2021 | Laohakunakorn | B01D 3/14 |
| 2021/0171836 A1* | 6/2021 | Purola | C10G 9/36 |

* cited by examiner

*Primary Examiner* — Ali Z Fadhel
(74) *Attorney, Agent, or Firm* — SHOOK, HARDY & BACON, L.L.P.

(57) ABSTRACT

Methods and systems for hydrodeoxygenating a bio-derived feedstock during the production of renewable diesel and generating renewable power as part of the hydrodeoxygenation (HDO) process are provided herein. One method includes providing an HDO catalyst within either a shell or tube side of an isothermal HDO reactor including a shell-and-tube configuration and exposing a bio-derived feedstock to the HDO catalyst within the isothermal HDO reactor to form an HDO reactor effluent. The method also includes flowing a water stream through the opposite side of the isothermal HDO reactor as compared to the side including the HDO catalyst to remove the heat of reaction between the bio-derived feedstock and the HDO catalyst, where the removal of the heat of reaction using the water stream forms steam. The method further includes flowing the steam through a steam turbine to provide for the generation of renewable power.

20 Claims, 5 Drawing Sheets

METHODS AND SYSTEMS FOR HYDRODEOXYGENATING BIO-DERIVED FEEDSTOCKS AND GENERATING RENEWABLE POWER

FIELD OF THE INVENTION

The techniques described herein relate to renewable diesel production and renewable power generation. More particularly, the techniques described herein relate to methods and systems for hydrodeoxygenating a bio-derived feedstock during the production of renewable diesel, while also generating renewable power as part of the hydrodeoxygenation process.

BACKGROUND OF THE INVENTION

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

Renewable diesel is typically produced via a two-stage process. The first stage is a hydrodeoxygenation (HDO) (or hydrotreatment) stage in which a bio-derived feedstock is hydrotreated within one or more HDO reactors for the removal of oxygen and the saturation of double bonds. This step yields an intermediate product consisting primarily of diesel-range n-paraffins. This intermediate product typically has an excellent cetane rating and low concentrations of sulfur and nitrogen compared to conventional mineral diesel. However, due to its high cloud point, the intermediate product is typically unsuitable for direct blending into diesel fuel.

Therefore, to reduce the cloud point, the intermediate product is sent to the second stage, which is a catalytic isomerization and dewaxing (IDW) stage. During this stage, the cloud point of the intermediate product is reduced via either of two dewaxing methods (or, more likely, a combination of the two dewaxing methods). The first dewaxing method, referred to as "cracking," requires the selective cracking of the long-chain n-paraffins within the intermediate product to produce lower-molecular-weight products that have a suitably lower cloud point and/or may be removed by distillation. The second dewaxing method, referred to as "catalytic isomerization" or simply "isomerization", requires the isomerization of straight-chain paraffins and substantially-straight-chain paraffins to a more branched species with suitably lower cloud points.

In general, renewable diesels are formed using bio-derived feedstocks, such as triglyceride feedstocks, bio-oil feedstocks, and/or other types of biomass-derived feedstocks that include fatty acids and/or fatty acid derivatives, such as fatty acid alkyl esters and/or triglycerides. Many types of bio oils, triglycerides, fatty acids, and fatty acid derivatives have carbon chain lengths between $C_{10}$ and $C_{22}$. As a result, such bio oils, triglycerides, fatty acids, and fatty acid derivatives are a useful starting point for the formation of diesel fuel or other distillate boiling range fuels.

Feedstocks containing bio oils, triglycerides, fatty acids, and/or fatty acid derivatives also typically contain a substantial amount of oxygen. For example, a triglyceride typically includes a total of six oxygen atoms, corresponding to an ester linkage between the propyl backbone and the long carbon chain of the fatty acid. It is typically desirable to remove the oxygen from a distillate boiling range fraction prior to using such a fraction as a fuel.

Unfortunately, in a commercial scale reactor, attempting to remove oxygen from a feedstock containing bio oils, fatty acids, and/or fatty acid derivatives can result in a large, localized heat release. In a conventional HDO reactor, this heat release can potentially result in localized temperature increases on the order of hundreds of degrees Fahrenheit. This type of localized heat release is undesirable in a reactor, as it can lead to a variety of problems for the catalyst beds in the reactor and can compromise the structural integrity of the reactor itself. As a result, conventional methods for performing deoxygenation on feedstocks containing bio oils, triglycerides, fatty acids, and/or fatty acid derivatives typically include a substantial amount of recycle of product and/or addition of other streams that are relatively unreactive under deoxygenation conditions. The recycle dilutes the fresh feedstock with product that is already deoxygenated. This reduces the density of oxygen in the feedstock, resulting in a smaller heat release per unit time in a given localized volume. However, the substantial amount of recycle (and/or low reactivity streams) that is required means that the size of the reactor and/or various support components (e.g., pumps, compressor, separators, fired heater, and heat exchangers) needed to perform the deoxygenation is substantially increased.

SUMMARY OF THE INVENTION

An embodiment described herein provides a method for hydrodeoxygenating a bio-derived feedstock and generating renewable power. The method includes providing a hydrodeoxygenation (HDO) catalyst within either a shell side or a tube side of an isothermal HDO reactor including a shell-and-tube configuration and exposing a bio-derived feedstock to the HDO catalyst within the isothermal HDO reactor to form an HDO reactor effluent. The method also includes flowing a water stream through an opposite one of the shell side or the tube side of the isothermal HDO reactor as compared to the HDO catalyst to remove a heat of reaction between the bio-derived feedstock and the HDO catalyst, where the removal of the heat of reaction using the water stream forms steam. The method further includes flowing the steam through a steam turbine to provide for the generation of renewable power.

Another embodiment described herein provides an HDO unit. The HDO unit includes one or more isothermal HDO reactors including a shell-and-tube configuration. Each isothermal HDO reactor is configured to produce an HDO reactor effluent via reaction between a bio-derived feedstock and an HDO catalyst residing on either a shell side or a tube side of the isothermal HDO reactor. Moreover, a water stream flows through an opposite one of the shell side or the tube side of each isothermal HDO reactor as compared to the HDO catalyst to remove a heat of reaction between the bio-derived feedstock and the HDO catalyst, where the removal of the heat of reaction via the water stream generates steam. The HDO includes also includes a steam turbine configured to generate renewable power using the steam.

BRIEF DESCRIPTION OF THE DRAWINGS

Advantages of the present techniques may become apparent upon reviewing the following detailed description and drawings of non-limiting examples in which.

Figure 1:
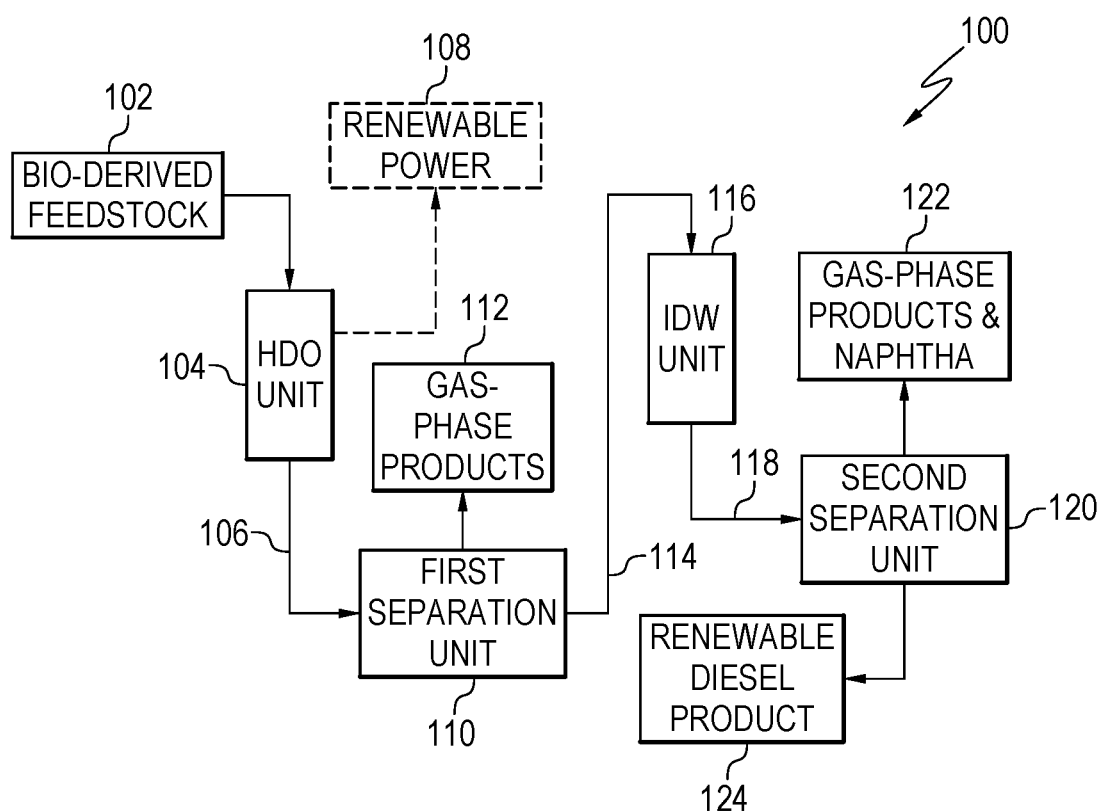
FIG. 1 is a simplified schematic view of an exemplary reaction system for producing renewable diesel and renewable power according to embodiments described herein.

It should be noted that the figures are merely examples of the present techniques and are not intended to impose limitations on the scope of the present techniques. Further, the figures are generally not drawn to scale, but are drafted for purposes of convenience and clarity in illustrating various aspects of the techniques.

DETAILED DESCRIPTION OF THE PREFERRED EMBODIMENTS

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

Terminology

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the terms "a" and "an" mean one or more when applied to any embodiment described herein. The use of "a" and "an" does not limit the meaning to a single feature unless such a limit is specifically stated.

The terms "about" and "around" mean a relative amount of a material or characteristic that is sufficient to provide the intended effect. The exact degree of deviation allowable in some cases may depend on the specific context, e.g., ±1%, ±5%, ±10%, ±15%, etc. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

The term "cetane rating" refers to a numerical indicator of the combustion speed of a diesel fuel and the amount of compression needed to ignite the fuel or, in other words, a numerical indicator of how readily and completely the fuel will burn in a combustion chamber. Generally speaking, the higher the cetane rating, the faster the fuel will ignite and the more completely it will burn. The cetane rating is determined by comparing the combustion characteristics in a test engine with blends of reference fuels of known cetane ratings. Moreover, there are several different techniques for measuring the cetane rating of a fuel. The true cetane rating is measured by an engine test (i.e., according to ASTM D613). However, since this test is expensive and requires a large sample volume, the cetane rating is often reported as a cetane index, which is a proxy for the cetane rating that is calculated using standard empirical correlations (e.g. according to ASTM D976 or ASTM D4737). Alternatively, the cetane rating is reported as a derived cetane rating (e.g. according to ASTM D7668). Typical diesel fuels have a cetane rating of between around 40 to 60, although higher cetane ratings are preferable.

The "cloud point" of an oil is the temperature below which paraffin wax or other solid substances begin to crystallize or separate from the solution, imparting a cloudy appearance to the oil when the oil is chilled under prescribed conditions. Exemplary conditions for measuring cloud point are described in ASTM D7346 and ASTM D2500. The cloud point is an important property of fuel because the presence of solidified waxes can clog filters and negatively impact engine performance.

As used herein, the term "configured" means that the element, component, or other subject matter is designed and/or intended to perform a given function. Thus, the use of the term "configured" should not be construed to mean that a given element, component, or other subject matter is simply "capable of" performing a given function but that the element, component, or other subject matter is specifically selected, created, implemented, utilized, and/or designed for the purpose of performing the function.

As used herein, the terms "example," exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure, or method is not intended to be limiting, required, or exclusive/exhaustive; and other components, features, structures, or methods, including structurally and/or functionally similar and/or equivalent components, features, structures, or methods, are also within the scope of the present techniques.

As used herein, the term "fluid" refers to gases, liquids, and combinations of gases and liquids, as well as to combinations of gases and solids, and combinations of liquids and solids.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

As used herein, the "liquid hourly space velocity (LHSV)" for a feedstock or portion of a feedstock to a reactor is defined as the volume of feedstock per hour relative to the volume of catalyst in the reactor.

The term "pressure" refers to a force acting on a unit area. A pressure value is typically expressed as a number of pounds per square inch (psi).

As used herein, the term "renewable diesel" refers to a hydrocarbon product produced from bio-derived feedstocks. Examples of typical feedstocks for renewable diesel production include diglycerides, monoglycerides, triglycerides, fatty acid methyl esters (FAME), free fatty acids, and the like, which are often derived from plant oils, animal fats, or algae oils. Relatedly, the term "bio-diesel" generally refers to a hydrocarbon product produced by blending varying proportions of bio-derived feedstocks with standard feedstocks. Renewable diesel is generally preferable over the more conventional bio-diesel because, in contrast to bio-diesel, renewable diesel contains very low concentrations of oxygenates and can therefore be used in concentrations of up to 100% in conventional diesel engines. Accordingly, there is no blending limit for renewable diesels.

In this discussion, a "Cx" hydrocarbon refers to a hydrocarbon compound that includes "x" number of carbons in the compound. A stream containing "Cx-Cy" hydrocarbons refers to a stream composed of one or more hydrocarbon compounds that includes at least "x" carbons and no more than "y" carbons in the compound. It is noted that a stream containing "Cx-Cy" hydrocarbons may also include other types of hydrocarbons, unless otherwise specified.

References to a periodic table, such as references to the Group number of a metal, are defined herein as references to the current version of the IUPAC periodic table.

Certain aspects and features are described herein using a set of numerical upper limits and a set of numerical lower limits. It should be appreciated that ranges from any lower limit to any upper limit are contemplated unless otherwise indicated. All numerical values are "about" or "approximately" the indicated value, and account for experimental errors and variations that would be expected by a person having ordinary skill in the art.

Overview

As described herein, the production of renewable diesel from bio-derived feedstocks typically includes two main stages, the hydrodeoxygenation (HDO) (or hydrotreatment) stage and the isomerization/dewaxing (IDW) stage. Due to the nature of the HDO reaction, the HDO stage is highly exothermic, and controlling the temperature inside the HDO reactor(s) to within the limits of the HDO reactor(s) and the catalyst is a challenge.

Conventionally, various methods have been used to manage the temperature within HDO reactors. Typically, each HDO reactor consists of multiple fixed beds including an HDO catalyst. To control the temperature rise within each bed, one conventional approach includes introducing a quench stream into the HDO reactor, such as a quench stream formed from hydrogen, HDO-reactor-produced paraffin, and/or a recycled portion of the final diesel product. Another conventional approach is to split the feedstock into various beds or to use inter-bed heat exchangers to manage the heat release. Moreover, various combinations of these approaches have also been used.

However, these conventional approaches involve several drawbacks. In particular, when hydrogen is used as a quench medium, the vapor fraction within the overall reaction system is increased. As a result, the reaction system must be configured with larger equipment, including larger HDO reactors, larger heat exchangers within the HDO reactor effluent circuit, and/or larger recycle compressors. Similarly, when recycled product is used as the quench medium, the HDO unit of the reaction system must be configured with larger equipment. For example, for a 10 thousand barrels per day (kBD) fresh feed HDO unit, if a portion of the product is recycled as a quench medium, the flowrate of the recycled product will be around kBD. Hence, the capacity of the HDO unit will need to be sized for 20 kBD. As a result, such approaches increase the capital expenditures for building the reaction system. In addition, such approaches increase the ongoing operating costs for the reaction system since more power is required to operate the corresponding equipment. In some cases, these increased costs can make the economical production of renewable diesel challenging.

Accordingly, embodiments described herein provide techniques for producing renewable diesel using a novel HDO unit including one or more isothermal HDO reactors, as described further herein. The use of such isothermal HDO reactor(s) may advantageously enable the use of relatively small reactors with capacities that closely match the feed throughput. This may, in turn, result in significant cost savings in terms of both capital expenditures and operating costs. Furthermore, the use of the novel HDO unit including the isothermal HDO reactor(s) also results in the generation of renewable power as part of the HDO process. The generated renewable power (or a portion thereof) may then be advantageously utilized as the baseload power for the reaction system, thus avoiding the intermittency issues associated with other renewable power sources, such as wind and solar. Additionally or alternatively, the generated renewable power (or a portion thereof) may be exported and used for other purposes.

Exemplary Bio-Derived Feedstock Options

Embodiments described herein may be used to produce renewable diesel from any suitable type of bio-derived feedstock, where the term "bio-derived feedstock" refers to a hydrocarbon feedstock derived from a biological raw material source, such as vegetable, animal, fish, and/or algae. For example, suitable feedstocks include diglycerides, monoglycerides, triglycerides, fatty acid methyl esters (FAME), free fatty acids, and the like, derived from plant oils, animal fats, or algae oils. Moreover, according to embodiments described herein, a feedstock that has been pretreated to remove metals, gums, and other contaminants (such as refined, bleached, and deodorized (RBD) grade vegetable oil) is preferred.

As used herein, the term "vegetable oil" refers generally to any plant-based material and can include fats/oils derived from plant sources, such as plants of the genus Jatropha.

Generally, the biological sources used for the bio-derived feedstock can include vegetable oils/fats, animal oils/fats, fish oils, pyrolysis oils, and/or algae lipids/oils, as well as any components of such biological sources. In some embodiments, the biological sources specifically include one or more types of lipid compounds, where the term "lipid compound" generally refers to a biological compound that is insoluble in water, but soluble in nonpolar (or fat) solvents. Non-limiting examples of such solvents include alcohols, ethers, chloroform, alkyl acetates, benzene, and combinations thereof.

Major classes of lipids include, but are not limited to, fatty acids, glycerol-derived lipids (including fats, oils, and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes. In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used according to embodiments described herein include, but are not limited to, rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil, and rice bran oil. According to embodiments described herein, vegetable oils can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used according to embodiments described herein include, but are not limited to, beef fat (tallow), hog fat (lard), turkey fat, fish fat/oil, and chicken fat. The animal fats can be obtained from any suitable source, including restaurants and meat production facilities. According to embodiments described herein, animal fats can also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on the total weight of the biomass itself. Algal sources for algae oils include, but are not limited to, unicellular and multicellular algae. Examples of such algae include rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui*, and *Chlamydomonas reinhardtii*.

Moreover, according to embodiments described herein, the bio-derived feedstock can include any feedstock that consists primarily of triglycerides and free fatty acids (FFAs). The triglycerides and FFAs typically contain aliphatic hydrocarbon chains in their structure having from 8 to 36 carbons, or preferably from 10 to 26 carbons, or most preferably from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can consist of $C_{10}$ to $C_{26}$ fatty acid constituents, based on the total triglyceride present in the lipid material.

Furthermore, a triglyceride is a molecule having a structure substantially identical to the reaction product of glycerol and three fatty acids. Thus, although a triglyceride is described herein as consisting of fatty acids, it should be understood that the fatty acid component does not necessarily contain a carboxylic acid hydrogen. In one embodiment, a majority of triglycerides present in the biocomponent feedstock can preferably consist of $C_{10}$ to $C_{26}$ fatty acid constituents, based on the total triglyceride content. Other types of feedstocks that are derived from biological raw material components can include fatty acid esters, such as fatty acid alkyl esters (e.g., FAME and/or FAEE).

A feedstock derived from a biological source can have a wide range of nitrogen and/or sulfur contents. For example, a feedstock based on a vegetable oil source can contain up to 300 weight parts per million (wppm) nitrogen. In contrast, a biomass-based feedstock containing whole or ruptured algae can sometimes include a higher nitrogen content. Depending on the type of algae, the nitrogen content of an algae-based feedstock can be at least 2 wt %, for example at least 3 wt %, at least 5 wt %, such as up to 10 wt % or possibly still higher. The sulfur content of a feedstock derived from a biological source can also vary. In some cases, the sulfur content can be 1,000 wppm or less, or 500 wppm or less, or 200 wppm or less, or 100 wppm or less, or 50 wppm or less, such as down to being substantially free of sulfur (e.g., 1.0 wppm or less).

Aside from nitrogen and sulfur, oxygen can be another heteroatom component in feedstocks derived from a biological source. For example, a feedstock derived from a biological source, prior to hydrodeoxygenation, can include, for example, 1.0 wt % to 20 wt % of oxygen, or 1.0 wt % to 12 wt %, or 3.0 wt % to 20 wt %, or 3.0 wt % to 12 wt %, or 4.0 wt % to 20 wt %, or 4.0 wt % to 12 wt %.

In some embodiments, a portion of a mineral feedstock can be co-processed with a feedstock derived from a biological source. A mineral feedstock refers to a conventional feedstock that has typically been derived from crude oil and optionally been subjected to one or more separation and/or other refining processes. As an example, the mineral feedstock can be a petroleum feedstock boiling in the diesel range or above. Examples of suitable feedstocks can include, but are not limited to, virgin distillates, hydrotreated virgin distillates, kerosene, naphtha, diesel boiling range feedstocks (such as hydrotreated diesel boiling range feeds), light cycle oils, atmospheric gasoils, or combinations thereof. The amount of mineral feedstock blended with a feedstock derived from a biological source can correspond to 1.0 wt % to 50 wt % of the weight of the blended feedstock, or 1.0 wt % to 30 wt %, or 1.0 wt % to 20 wt %, or 10 wt % to 50 wt %, or 10 wt % to 30 wt %.

Mineral feedstocks for blending with a bio-derived feedstock can be relatively free of nitrogen (such as a previouslyhydrotreated feedstock) or can have a nitrogen content from about 1 wppm to about 2,000 wppm nitrogen, for example from about 50 wppm to about 1,500 wppm or from about 75 to about 1,000 wppm. In some embodiments, the mineral feedstock can have a sulfur content from about 1 wppm to about 10,000 wppm sulfur, for example from about 10 wppm to about 5,000 wppm or from about 100 wppm to about 2,500 wppm. In various aspects, the combined feedstock can have an oxygen content of 1.0 wt % or more, such as 1.0 wt % to 15 wt %.

The content of sulfur, nitrogen, oxygen, and olefins in a feedstock created by blending two or more feedstocks can typically be determined using a weighted average based on the blended feedstock. For example, a mineral feedstock and a bio-derived feedstock can be blended in a ratio of 20 wt % mineral feedstock and 80 wt % bio-derived feedstock. If the mineral feedstock has a sulfur content of about 1,000 wppm, and the bio-derived feedstock has a sulfur content of about 10 wppm, the resulting blended feedstock could be expected to have a sulfur content of about 208 wppm.

Exemplary HDO Process Options

According to embodiments described herein, the feedstock undergoes a hydrodeoxygenation process that results in the generation of renewable power. In various embodiments, the HDO process is used to remove heteroatoms, including oxygen as well as potentially sulfur and nitrogen, from the feedstock. The HDO process can also be used to saturate olefins.

According to embodiments described herein, this HDO process is performed using a novel HDO reactor scheme. In particular, the HDO process is performed using one or more HDO reactors that are operated isothermally. In various embodiments, such isothermal HDO reactors are configured similarly to shell-and-tube heat exchangers, with an HDO catalyst on the shell side or the tube side, depending on the details of the particular implementation. On the opposite side of the catalyst, water is boiled to generate steam that removes the heat of reaction, thus enabling the HDO reaction to be conducted isothermally. In such a configuration, the pressure on the water side of the HDO reactor determines the saturation temperature for steam generation. In general, the pressure on the water side is higher than the operating pressure on the process side. However, the pressure can also be lowered to optimize the required heat transfer surface area.

Effective hydrodeoxygenation (or hydrotreatment) conditions for processing the bio-derived feedstock using the isothermal HDO reactor(s) include a temperature of around 500 degrees Fahrenheit (° F.) to around 1,000° F., or around 600° F. to around 900° F., as well as a pressure of around 300 pounds per square inch gauge (psig) to around 1,200 psig, or around 800 psig to 900 psig. As a non-limiting example, the isothermal HDO reactor(s) may be operated at a temperature of around 600° F. and a pressure of around 850 psig.

As a result, steam can be generated at any pressure ranging from around 50 psig to around 1,500 psig. As a non-limiting example, for embodiments in which the isothermal HDO reactor(s) are operated at a temperature of around 650° F., steam may be produced at a pressure of around 900 psig. Moreover, in various embodiments, the steam is generated at a greater pressure than the operating pressure of the HDO reactor(s) to ensure that hydrocarbons will not leak into the steam portion of the HDO unit if there is a leak. Notably, as water is one of the products of the HDO reaction, it does not have a substantial impact on the reaction kinetics.

In various embodiments, the generated steam is then optionally superheated using any suitable heat input device (s), such as fired heaters that are used elsewhere in the process. Such fired heaters may include, but are not limited to, the HDO reactor feed heater, the IDW reactor feed heater, or the fractionator feed heater or fractionator fired reboiler. The superheated steam is then let down to a low pressure in a steam turbine to provide for the generation of renewable power. In some embodiments, the steam turbine exhaust is condensed, treated, and then reused. Alternatively, depending on where the overall reaction system is located, the steam may be integrated into an existing steam system and potentially utilized as an extraction steam turbine instead of a condensing stream turbine. In general, the integration is site-specific, with the configuration varying depending on the details of the particular implementation.

Some examples of suitable HDO catalysts that may be used within the isothermal HDO reactor(s) include catalysts containing Group 6 and/or Group 8-10 metals on a support material, such as alumina or silica. The Group 6 metal(s), in oxide form, can typically be present in an amount ranging from 2.0 wt % to 40 wt %, relative to a total weight of the catalyst, or 6.0 wt % to 40 wt %, or 10 wt % to 30 wt %. When a Group 8-10 metal is also present, the Group 8-10 metal, in oxide form, can typically be present in an amount ranging from 2.0 wt % to 40 wt %, preferably for supported catalysts from 2.0 wt % to 20 wt % or from 4.0 wt % to 15 wt %.

In various embodiments, the HDO process deoxygenates the feedstock, helping to avoid problems with catalyst poisoning or deactivation due to the creation of water ($H_2O$) or carbon oxides (e.g., CO and $CO_2$) during catalytic dewaxing. Accordingly, the HDO process can be used to remove, for example, at least 90%, at least 95%, at least 98%, at least 99%, at least 99.5%, at least 99.9%, or completely (measurably) all of the oxygen present in the biocomponent feedstock. Alternatively, the oxygenate level of the feedstock can be reduced to, for example, 0.1 wt % or less, 0.05 wt % or less, 0.03 wt % or less, 0.02 wt % or less, 0.01 wt % or less, 0.005 wt % or less, 0.003 wt % or less, 0.002 wt % or less, or 0.001 wt % or less.

In various embodiments, the sulfur and nitrogen contents of the feedstock are also advantageously reduced during the HDO process. For example, in some embodiments, the HDO process reduces the sulfur content of the feedstock to a suitable level, such as, for example, less than about 100 weight parts per million (wppm), less than about 50 wppm, less than about 30 wppm, less than about 25 wppm, less than about 20 wppm, less than about 15 wppm, or less than about 10 wppm. In other embodiments, the HDO process reduces the sulfur content of the feedstock to less than about 5 wppm or less than about 3 wppm. With regard to nitrogen, in some embodiments, the HDO process reduces the nitrogen content of the feedstock to a suitable level, such as, for example, about 30 wppm or less, about 25 wppm or less, about wppm or less, about 15 wppm or less, about 10 wppm or less, about 5 wppm or less, or about 3 wppm or less.

Exemplary Separation Process Options

In various embodiments, because the HDO process is performed prior to the IDW process, a separation device may be used to separate out impurities from the HDO reactor effluent prior to passing the HDO reactor effluent to the IDW reactor. In particular, the separation process minimizes the amount of $H_2O$, $CO_2$, and CO that is slipped into the IDW reactor by separating the gas and liquid phases within the HDO reactor effluent. While an interstage stripper is often preferred for this purpose, any suitable separation device can be used, such as, for example, any suitable type of separator or fractionator that is configured to separate gas-phase products from liquid-phase products.

Exemplary IDW Process Options

In various embodiments, an IDW process is performed on the HDO reactor effluent to improve one or more properties of the final renewable diesel fuel (or fuel-blending product). It is noted that both hydrodeoxygenation and the additional cracking and/or catalytic dewaxing can occur at the same time. However, due to the relatively rapid rate for hydrodeoxygenation under conditions suitable for cracking and/or dewaxing, at least a portion of the cracking and/or catalytic dewaxing typically occurs after hydrodeoxygenation has been substantially completed. In particular, in various embodiments, after the HDO reactor effluent exits the HDO reactor (and, optionally, the interstage stripper or other separation device), the HDO reactor effluent is passed into an IDW reactor that is configured to isomerize and/or remove long-chain, paraffinic molecules from the HDO reactor effluent using any suitable IDW catalyst(s). The IDW reactor may include any suitable type of reactor arranged in any suitable configuration. For example, in some embodiments, the IDW reactor is a fixed-bed adiabatic reactor that is loaded with the IDW catalyst.

Suitable IDW catalysts can include molecular sieves, such as crystalline aluminosilicates (zeolites). More generally, IDW catalysts can correspond to catalysts having a zeotype framework. The IDW catalyst can optionally be a supported catalyst, such as a catalyst including a zeotype framework and a binder material. In some embodiments, the zeotype framework can include, consist essentially of, or be ZSM-5, ZSM-22, ZSM-23, ZSM-35, ZSM-48, zeolite Beta, or a combination thereof, for example, ZSM-23 and/or ZSM-48, or ZSM-48 and/or zeolite Beta. Optionally but preferably, zeotype frameworks that are selective for dewaxing by isomerization as opposed to cracking can be used, such as ZSM-48, zeolite Beta, ZSM-23, or a combination thereof. Additionally or alternatively, the zeotype framework can include, consist essentially of, or be a 10-member ring 1-D zeotype framework. Optionally but preferably, the IDW catalyst can include a binder for the zeotype framework, such as alumina, titania, silica, silica-alumina, zirconia, or a combination thereof, for example alumina and/or titania or silica and/or zirconia and/or titania.

Aside from the zeotype framework(s) and optional binder, the IDW catalyst can also include at least one metal hydrogenation component, such as a Group 8-10 metal. Suitable Group 8-10 metals can include, but are not limited to, Pt, Pd, Ni, or a combination thereof. When a metal hydrogenation component is present, the dewaxing catalyst can include, for example, 0.1 wt % to 10 wt % of the Group 8-10 metal, or 0.1 wt % to 5.0 wt %, or 0.5 wt % to 10 wt %, or 0.5 wt % to 5.0 wt %, or 1.0 wt % to 10 wt %, or 1.0 wt % to 5.0 wt %.

In some embodiments, the IDW catalyst can include an additional Group 6 metal hydrogenation component, such as W and/or Mo. In such aspects, when a Group 6 metal is present, the IDW catalyst can include, for example, 0.5 wt % to 20 wt % of the Group 6 metal, or 0.5 wt % to 10 wt %, or 2.5 wt % to 20 wt %, or 2.5 wt % to 10 wt %. As one example, the IDW catalyst can include 0.1 wt % to 5.0 wt % Pt and/or Pd as the hydrogenation metal component. As another example, the IDW catalyst can include as the hydrogenation metal components Ni and W, Ni and Mo, or Ni and a combination of W and Mo.

Moreover, such catalytic isomerization and dewaxing is performed by exposing the feedstock to the IDW catalyst under effective isomerization and dewaxing conditions. Such conditions can include temperatures of, for example, around 550° F. (288° C.) to around 840° F., pressures of, for example, around 200 psig to around 5,000 psig, and liquid hourly space velocities (LHSVs) of the feedstock relative to the IDW catalyst within the range between, for example, around 0.1 hr' to around 10 hr'.

Exemplary Fractionation Process Options

In some embodiments, the isomerized product exiting the IDW reactor undergoes a fractionation process to separate the isomerized product into a relatively light fraction including naphtha and gas-phase products (e.g., $C_1$ to $C_4$ hydrocarbons) and a relatively heavy fraction including the final renewable diesel product. Separating the relatively light fraction from the final renewable diesel product allows the product to meet diesel flash point specifications. In various embodiments, this fractionation process may be accomplished using any suitable type of fractionator (or distillation column).

Exemplary Reaction Systems for Producing Renewable Diesel and Renewable Power

FIG. 1 is a simplified schematic view of an exemplary reaction system 100 for producing renewable diesel and renewable power according to embodiments described herein. As shown in FIG. 1, the bio-derived feedstock 102 is introduced into a hydrodeoxygenation (HDO) unit 104. Within the HDO unit 104, the bio-derived feedstock 102 is exposed to effective hydrodeoxygenation conditions within one or more isothermal HDO reactors (not shown), as described herein, in the presence of a suitable HDO catalyst, resulting in the generation of an HDO reactor effluent 106. In addition, renewable power 108 is output from the HDO unit 104, as described herein.

At least a portion of the HDO reactor effluent 106 exiting the HDO unit 104 is then introduced into a first separation unit 110, which may include one or more interstage strippers, for example. Within the first separation unit 110, gas-phase products 112 are separated from liquid-phase products, generating a liquid HDO reactor effluent 114. In various embodiments, this separation process reduces the concentration of oxygenates (e.g., CO, $CO_2$, and $H_2O$) within the liquid HDO reactor effluent 114, thus preventing such oxygenates from inhibiting the activity of the isomerization/dewaxing (IDW) catalyst during the subsequent IDW process.

The liquid HDO reactor effluent 114 exiting the first separation unit 110 is then introduced into an IDW unit 116 including one or more IDW reactors (not shown), as described herein. Within the IDW unit 116, the liquid HDO reactor effluent 114 is exposed to suitable catalytic isomerization/dewaxing conditions in the presence of one or more catalyst beds containing an IDW catalyst, resulting in the generation of an isomerized product stream 118.

Finally, the isomerized product stream 118 exiting the IDW unit 116 is introduced into a second separation unit 120, which may include one or more fractionators, for example. Within the second separation unit 120, the isomerized product stream 118 is separated into a relatively light fraction including gas-phase products and naphtha 122 and a relatively heavy fraction including a final renewable diesel product 124.

The schematic view of FIG. 1 is not intended to indicate that the reaction system 100 is to include all of the components shown in FIG. 1, or that the reaction system 100 is limited to only the components shown in FIG. 1. Rather, any number of components may be omitted from the reaction system 100, or added to the reaction system 100, depending on the details of the specific implementation. For example, in some embodiments, the first separation device 110 is omitted from the reaction system 100, and the HDO reactor effluent 106 is passed directly from the HDO unit 104 to the IDW unit 116. In addition, in some embodiments, the second separation system 120 is omitted, and the isomerized product stream 118 is used as the final renewable diesel product 124. Furthermore, it will be appreciated that the reaction system 100 is susceptible to any number of other modifications or variations without changing the overall technical effect of the system. For example, while the reaction system 100 of FIG. 1 is depicted as including separate HDO and IDW units 104 and 116, respectively, one of skill in the art will appreciate that the hydrotreatment and isomerization/dewaxing stages can alternatively be combined into a single unit without changing the overall technical effect of the reaction system 100.

Figure 2:
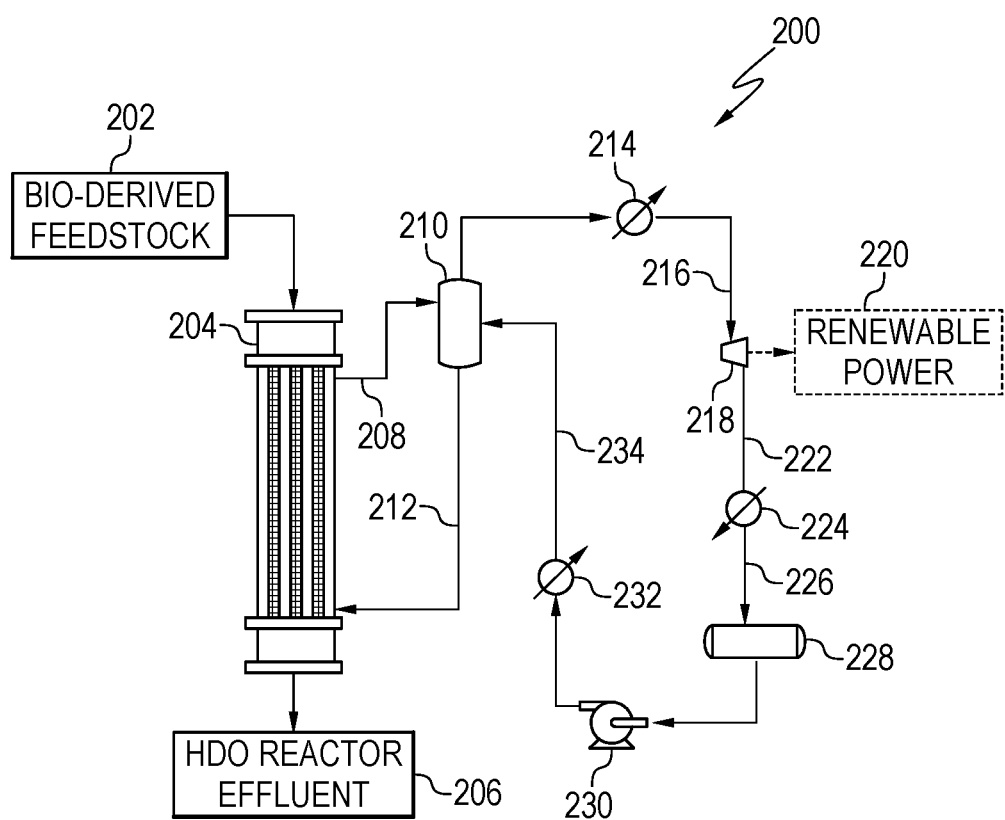
FIG. 2 is a schematic view of an exemplary hydrodeoxygenation (HDO) unit of a reaction system for producing renewable diesel and renewable power according to embodiments described herein.

FIG. 2 is a schematic view of an exemplary HDO unit 200 of a reaction system for producing renewable diesel and renewable power according to embodiments described herein. More specifically, FIG. 2 shows a portion of an exemplary reaction system, such as the reaction system 100 described with respect to FIG. 1, in which a bio-derived feedstock 202 is hydrotreated within an HDO reactor 204. As shown in FIG. 2, the HDO reactor 204 is a configured similarly to a shell-and-tube heat exchanger, with an HDO catalyst on the shell side or the tube side, depending on the details of the particular implementation. On the opposite side of the catalyst, water is boiled to generate steam that removes the heat of reaction, thus enabling the HDO reaction to be conducted isothermally. In such a configuration, the pressure on the water side of the HDO reactor determines the saturation temperature for steam generation.

During the HDO process, the bio-derived feedstock 202 is introduced into the HDO reactor 204. Within the HDO reactor 204, the bio-derived feedstock 202 is exposed to effective hydrodeoxygenation conditions within the presence of an HDO catalyst, as described herein, resulting in the output of an HDO reactor effluent 206. In some embodiments, effective hydrodeoxygenation conditions include temperatures of around 600° F. to around 1,000° F. and pressures of around 300 psig to around 1,200 psig, resulting in the generation of steam 208 at any suitable pressures ranging from around 50 psig to around 1,500 psig. In addition, in some embodiments, the steam 208 is generated at a greater pressure than the operating pressure of the HDO reactor 204 to ensure that hydrocarbons will not leak into the steam portion of the HDO unit 200 if there is a leak.

In various embodiments, the generated steam 208 is optionally passed through a steam drum 210. Within the steam drum 210, some amount of water 212 is separated from the steam 208 and then fed back into the HDO reactor 204 as the water stream (or at least a portion thereof). From the steam drum 210, the steam 208 is fed into a steam superheater 214, which may include any suitable heat input device(s) for superheating the steam 208. As a non-limiting example, the steam superheater 214 may include one or more fired heaters that are used elsewhere in the process. The resulting superheated steam 216 is then let down to a lower pressure in a steam turbine 218 to provide for the generation of renewable power 220.

The steam turbine exhaust 222 is then condensed within a condenser 224, and the resulting condensate 226 is passed through a condensate drum 228. From the condensate drum 228, the condensate is passed through a boiling feedwater (BFW) pump 230 and a BFW preheater 232, which increase the pressure and temperature of the stream, respectively. The resulting high-pressure, high-temperature stream 234 is then passed into the steam drum 210 and recombined with the steam 208 exiting the HDO reactor 204.

The schematic view of FIG. 2 is not intended to indicate that the HDO unit 200 is to include all of the components shown in FIG. 2, or that the HDO unit 200 is limited to only the components shown in FIG. 2. Rather, any number of components may be omitted from the HDO unit 200, or added to the HDO unit 200, depending on the details of the specific implementation. Moreover, the HDO unit 200 may include any suitable alternative configuration without changing the overall technical effect. For example, in some embodiments, the HDO unit 200 is configured to enable the extraction of steam at one or more stages of the HDO process. In particular, if steam is extracted at relatively low pressures, such steam may then be used as stripping steam and/or as a reboiler heat source. Additionally or alternatively, extracted steam may be exported to meet site steam balance demands, depending on the details of the particular implementation.

Figure 3:
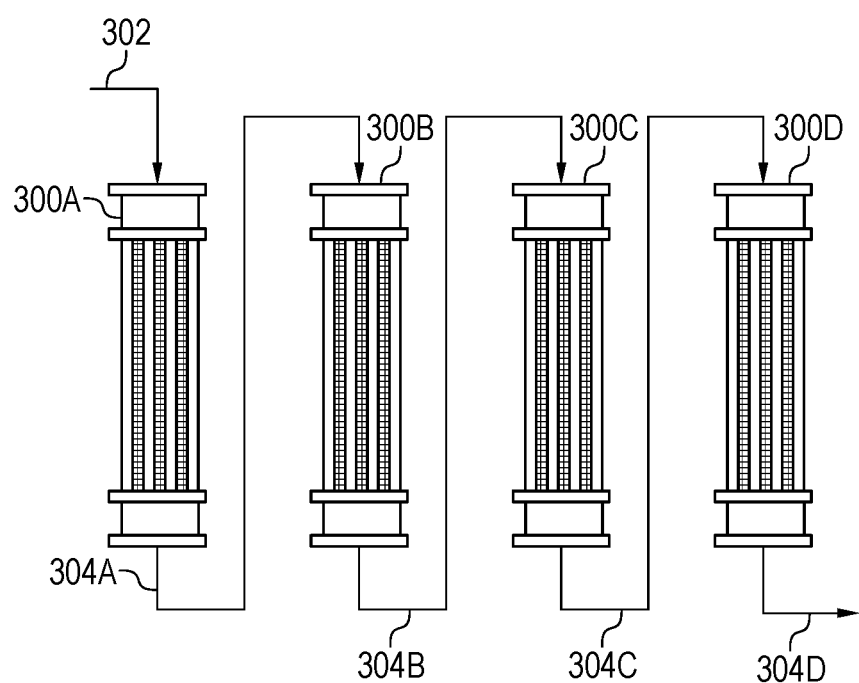
FIG. 3 is a schematic view of an exemplary configuration of isothermal HDO reactors in series within an exemplary HDO unit of a reaction system according to embodiments described herein.

FIG. 3 is a schematic view of an exemplary configuration of isothermal HDO reactors 300 in series within an exemplary HDO unit of a reaction system according to embodiments described herein. Specifically, the exemplary configuration of isothermal HDO reactors shown in FIG. 3 includes four isothermal HDO reactors 300A, 300B, 300C, and 300D arranged in series such that the first isothermal HDO reactor 300A receives the bio-derived feedstock 302 as input. The HDO reactor effluent 304A from the first isothermal HDO reactor 300A is then used as the input (or at least a portion of the input) for the second isothermal HDO reactor 300B. The HDO reactor effluent 304B from the second isothermal HDO reactor 300B is used as the input (or at least a portion of the input) for the third isotheral HDO reactor 300C. The HDO reactor effluent 304C from the third isothermal HDO reactor 300C is used as the input (or at least a portion of the input) for the fourth isotheral HDO reactor 300D. Moreover, the HDO reactor effluent 304D from the fourth isothermal HDO reactor 300D is used as the final HDO reactor effluent stream. In some embodiments, the exemplary configuration of isothermal HDO reactors 300 shown in FIG. 3 is used in place of the single isothermal HDO reactor 204 shown in the exemplary HDO unit 200 of FIG. 2.

Figure 4:
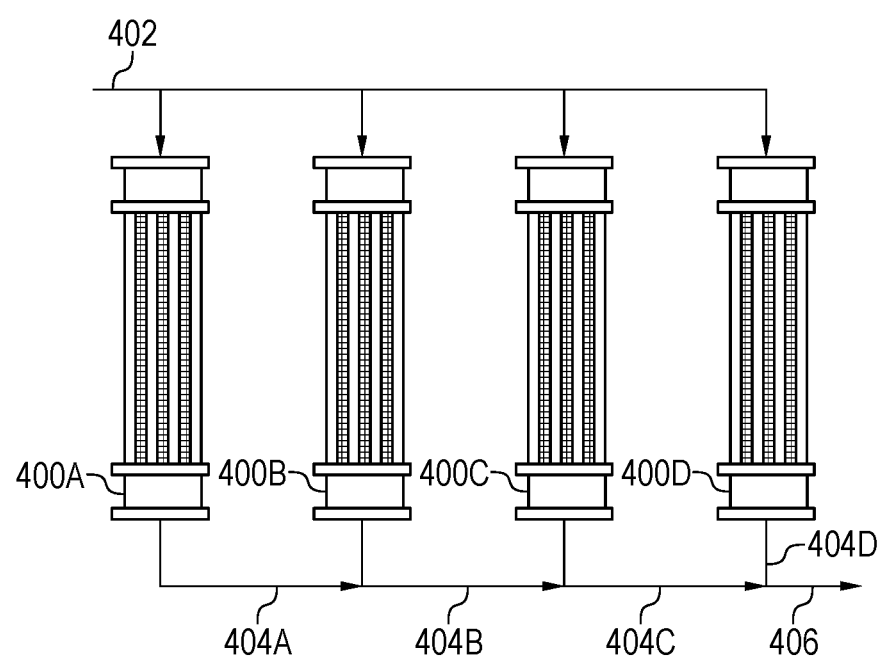
FIG. 4 is a schematic view of an exemplary configuration of isothermal HDO reactors in parallel within an exemplary HDO unit of a reaction system according to embodiments described herein.

FIG. 4 is a schematic view of an exemplary configuration of isothermal HDO reactors 400 in parallel within an exemplary HDO unit of a reaction system according to embodiments described herein. Specifically, the exemplary configuration of isothermal HDO reactors shown in FIG. 4 includes four isothermal HDO reactors 400A, 400B, 400C, and 400D arranged in parallel such that each isothermal HDO reactor 400A, 400B, 400C, and 400D receives a separate portion of the bio-derived feedstock 402 as input, and each isothermal HDO reactor 400A, 400B, 400C, and 400D outputs a separate HDO reactor effluent 404A, 404B, 404C, and 404D, respectively, which may then be combined into a single HDO reactor effluent stream 406. In some embodiments, the exemplary configuration of isothermal HDO reactors 400 shown in FIG. 4 is used in place of the single isothermal HDO reactor 204 shown in the exemplary HDO unit 200 of FIG. 2.

Moreover, it is to be understood that the schematic views of FIGS. 3 and 4 only represent two exemplary configurations for the isothermal HDO reactors described herein. In practice, any suitable number of isothermal HDO reactors may be combined into any suitable configuration, depending on the details of the particular implementation. In particular, the isothermal HDO reactors can be arranged in various configurations depending on the capacity of the overall HDO unit and the size of the isothermal HDO reactors. For example, in some embodiments, the isothermal HDO reactors may be arranged in a configuration including both reactors arranged in series and reactors arranged in parallel.

Exemplary Method for Producing Renewable Diesel and Renewable Power

Figure 5:
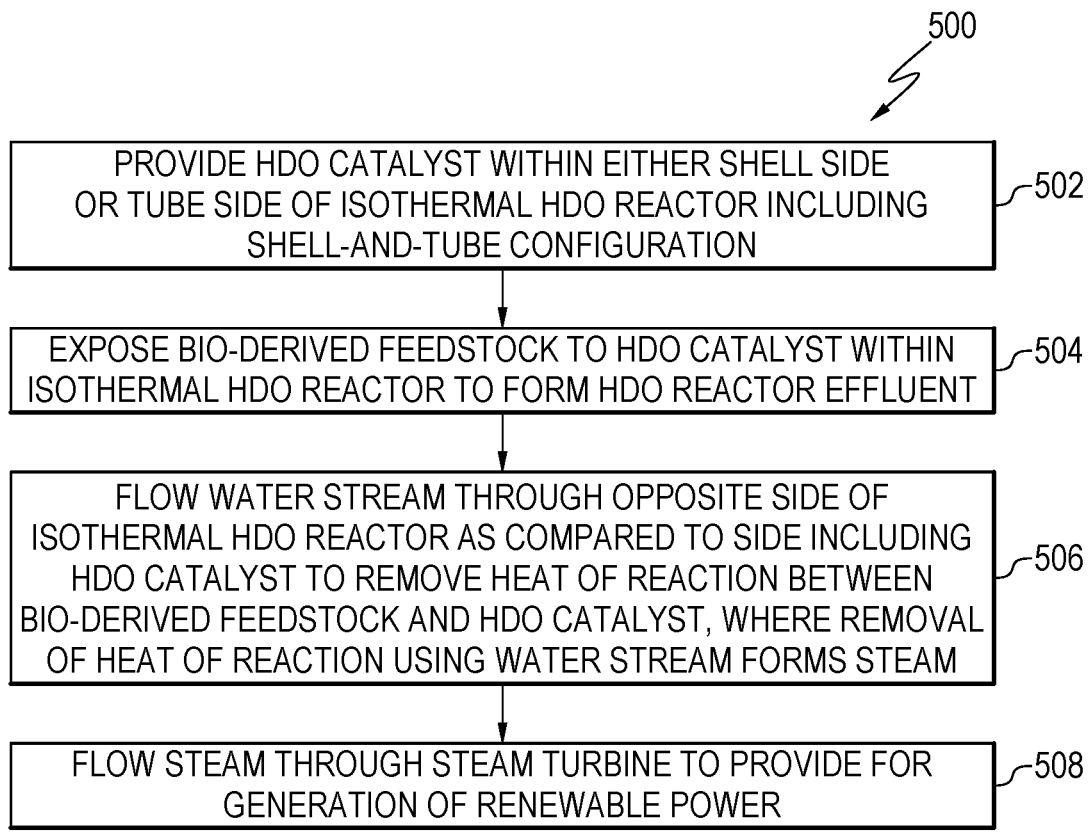
FIG. 5 is a process flow diagram of a method for hydrodeoxygenating a bio-derived feedstock and generating renewable power as part of the hydrodeoxygenation process according to embodiments described herein.

FIG. 5 is a process flow diagram of a method 500 for hydrodeoxygenating a bio-derived feedstock and generating renewable power as part of the hydrodeoxygenation process according to embodiments described herein. In various embodiments, the method 500 is implemented within a suitable HDO unit, such as the exemplary HDO unit 200 described with respect to FIG. 2 (or any suitable variations thereof), which may form part of a reaction system for producing renewable diesel, such as exemplary reaction system 100 described with respect to FIG. 1 (or any suitable variations thereof).

The method 500 begins at block 502, at which an HDO catalyst is provided within either a shell side or a tube side of one or more isothermal HDO reactors including a shell-and-tube configuration. In some embodiments, the isothermal HDO reactor(s) include a number of isothermal HDO reactors arranged in series or in parallel, or in some combination thereof.

At block 504, a bio-derived feedstock is exposed to the HDO catalyst within the isothermal HDO reactor(s) to form an HDO reactor effluent. In various embodiments, the isothermal HDO reactor(s) are operated with an operating temperature of between 500° F. and 1,000° F. and an operating pressure of between 300 psig and 1,200 psig.

At block 506, a water stream is flowed through the opposite side of the isothermal HDO reactor(s) as compared to the side including the HDO catalyst to remove the heat of reaction between the bio-derived feedstock and the HDO catalyst, where the removal of the heat of reaction using the water stream forms steam. In other words, if the HDO catalyst is provided on the shell side of the isothermal HDO reactor(s), the water stream is flowed through the tube side of the reactor(s). Conversely, if the HDO catalyst is provided on the tube side of the reactor(s), the water stream is flowed through the shell side of the reactor(s). In this manner, each isothermal HDO reactor is configured to behave similarly to a shell-and-tube heat exchanger, in which the heat generated via the HDO reaction between the bio-derived feedstock and the HDO catalyst is removed via indirect contact with the water stream on the opposite side of the reactor.

In various embodiments, the steam is formed with a pressure of between 50 psig and 1,500 psig. Moreover, in some embodiments, the steam is formed with a pressure that is higher than the operating pressure of the isothermal HDO reactor(s) to ensure that hydrocarbons will not leak into the steam portion of the HDO unit is there is a leak.

In various embodiments, steam is passed through a steam drum and a steam superheater upstream of the steam turbine. In such embodiments, the steam superheater may be any suitable device that is capable of increasing the temperature of the steam that is formed within the isothermal HDO reactor(s). Moreover, in such embodiments, water separated from the steam within the steam drum is recycled back into the isothermal HDO reactor(s) as at least a portion of the water stream of block 506.

At block 508, the steam is flowed through a steam turbine to provide for the generation of renewable power. In other words, as appreciated by those skilled in the art, the steam turbine extracts the thermal energy from the high-pressure steam and uses such extracted energy to mechanically drive an electrical generator, which generates the renewable power.

In some embodiments, the exhaust from the steam turbine is then condensed within a condenser, forming a condensed stream. The pressure and temperature of the condensed stream may then be increased using a pump and a preheater, respectively, forming a high-pressure, high-temperature stream. The high-pressure, high-temperature stream may then be recombined with the steam upstream of the steam turbine.

The process flow diagram of FIG. 5 is not intended to indicate that the steps of the method 500 are to be executed in any particular order, or that all of the steps of the method 500 are to be included in every case. Further, any number of additional steps not shown in FIG. 5 may be included within the method 500, depending on the details of the specific implementation. As an example, in some embodiments, the generated renewable power (or a portion thereof) is utilized as a baseload power supply for the corresponding reaction system, and/or the generated renewable power (of a portion thereof) is exported for other purposes. As another example, in some embodiments, steam is extracted at relatively low pressures from one or more stages of the process, and the extracted steam is then used for one or more other purposes. For example, such steam (or a portion thereof) may be used as stripping steam and/or as a reboiler heat source. Additionally or alternatively, such steam (or a portion thereof) may be exported to meet site steam balance demands. Moreover, in some embodiments, condensed steam from the reboiler may also be reused within the reaction system.

Furthermore, those skilled in the art will appreciate that the method 500 of FIG. 5 only accounts for the hydrodeoxygenation stage of the process for producing renewable diesel. Accordingly, in various embodiments, the HDO reactor effluent produced via the method 500 subsequently undergoes the isomerization/dewaxing stage of the process to produce the final renewable diesel product, as described herein.

Exemplary Implementation of Techniques Described Herein

For an exemplary implementation of the techniques described herein, a 10 kBD canola oil feedstock with a heat of reaction of around 60,000,000 British thermal units per hour (Btu/h) is utilized. In this implementation, steam is produced at a pressure of around 900 psig and a saturation temperature of around 535° F. The steam is then superheated to 900° F. using waste heat from a fired heater used elsewhere in the HDO process. The high-pressure superheated steam is passed through a steam turbine, in which the steam is let down to around 4" Hg absolute (HgA). As a result, around 6.7 megawatts (MW) of power is generated, assuming around 75% efficiency. Moreover, in some embodiments, the boiler feedwater preheat may be integrated with the rest of the unit to optimize the efficiency of the HDO process.

Exemplary Embodiments of Present Techniques

In one or more embodiments, the present techniques may be susceptible to various modifications and alternative forms, such as the following embodiments as noted in paragraphs 1 to 20:

1. A method for hydrodeoxygenating a bio-derived feedstock and generating renewable power, including: providing an HDO catalyst within either a shell side or a tube side of an isothermal HDO reactor including a shell-and-tube configuration; exposing a bio-derived feedstock to the HDO catalyst within the isothermal HDO reactor to form an HDO reactor effluent; flowing a water stream through an opposite one of the shell side or the tube side of the isothermal HDO reactor as compared to the HDO catalyst to remove a heat of reaction between the bio-derived feedstock and the HDO catalyst, where the removal of the heat of reaction using the water stream forms steam; and flowing the steam through a steam turbine to provide for the generation of renewable power.

2. The method of paragraph 1, including: passing the steam through a steam drum and a steam superheater upstream of the steam turbine; and recycling water separated from the steam within the steam drum back into the isothermal HDO reactor as at least a portion of the water stream.

3. The method of paragraph 1 or 2, including performing at least one of: utilizing at least a portion of the generated renewable power as a baseload power supply for a reaction system including the isothermal HDO reactor; or exporting at least a portion of the generated renewable power.

4. The method of any of paragraphs 1 to 3, including condensing an exhaust from the steam turbine within a condenser, forming a condensed stream.

5. The method of paragraph 4, including: increasing a pressure and a temperature of the condensed stream within a pump and a preheater, respectively, forming a high-pressure, high-temperature stream; and recombining the high-pressure, high-temperature stream with the steam upstream of the steam turbine.

6. The method of any of paragraphs 1 to 5, including operating the isothermal HDO reactor with an operating temperature that is in a range between 500° F. and 1,000° F. and an operating pressure that is in a range between 300 psig and 1,200 psig.

7. The method of paragraph 6, including forming the steam with a pressure that is in a range between 50 psig and 1,500 psig.

8. The method of paragraph 6, including forming the steam with a pressure that is higher than the operating pressure of the isothermal HDO reactor.

9. The method of any of paragraphs 1 to 8, including utilizing a number of isothermal HDO reactors arranged in series or in parallel, or in some combination thereof, to perform the method.

10. An HDO unit, including: at least one isothermal HDO reactor including a shell-and-tube configuration, where the at least one isothermal HDO reactor is configured to produce an HDO reactor effluent via reaction between a bio-derived feedstock and an HDO catalyst residing on either a shell side or a tube side of the at least one isothermal HDO reactor, where a water stream flows through an opposite one of the shell side or the tube side of the isothermal HDO reactor as compared to the HDO catalyst to remove a heat of reaction between the bio-derived feedstock and the HDO catalyst, and where the removal of the heat of reaction via the water stream generates steam; and a steam turbine configured to generate renewable power using the steam.

11. The HDO unit of paragraph 10, including a steam superheater configured to increase a temperature of the steam upstream of the steam turbine.

12. The HDO unit of paragraph 10 or 11, including: a steam drum configured to separate water from the steam upstream of the steam turbine; and a flowline configured to recycle the separated water back into the at least one isothermal HDO reactor as at least a portion of the water stream.

13. The HDO unit of any of paragraphs 10 to 12, where the HDO unit is configured to perform at least one of: utilizing at least a portion of the generated renewable power as a baseload power supply for the HDO unit; or exporting at least a portion of the generated renewable power.

14. The HDO unit of any of paragraphs 10 to 13, including a condenser to cool an exhaust from the steam turbine, forming a condensed stream.

15. The HDO unit of paragraph 14, including: a pump and a preheater configured to increase a pressure and a temperature, respectively, of the condensed stream, forming a high-pressure, high-temperature stream; and a flowline configured to recombine the high-pressure, high-temperature stream with the steam upstream of the steam turbine.

16. The HDO unit of any of paragraphs 10 to 15, where the HDO unit is configured to: extract a portion of the generated steam; and utilize the extracted steam as at least one of a stripping steam, a reboiler heat source, or a steam source for meeting site steam balance demands.

17. The HDO unit of any of paragraphs 10 to 16, where the at least one isothermal HDO reactor is configured to operate with an operating temperature that is in a range between 500° F. and 1,000° F. and an operating pressure that is in a range between 700 psig and 1,000 psig.

18. The HDO unit of paragraph 17, where the at least one isothermal HDO reactor is configured to form the steam with a pressure that is in a range between 50 psig and 1,500 psig.

19. The HDO unit of any of paragraphs 10 to 18, where the at least one isothermal HDO reactor is configured to form the steam with a pressure that is higher than the operating pressure of the at least one isothermal HDO reactor.

20. The HDO unit of any of paragraphs 10 to 19, where the at least one isothermal HDO reactor includes at least one of: a number of isothermal HDO reactors arranged in series; or a number of isothermal HDO reactors arranged in parallel.

Moreover, while the embodiments described herein are well-calculated to achieve the advantages set forth, it will be appreciated that such embodiments are susceptible to modification, variation, and change without departing from the spirit thereof. Indeed, the present techniques include all alternatives, modifications, and equivalents falling within the true spirit and scope of the appended claims.

What is claimed is:

1. A method for hydrodeoxygenating a bio-derived feedstock and generating renewable power, comprising:
providing a hydrodeoxygenation (HDO) catalyst within either a shell side or a tube side of an isothermal HDO reactor comprising a shell-and-tube configuration;
exposing a bio-derived feedstock to the HDO catalyst within the isothermal HDO reactor to form an HDO reactor effluent;
flowing a water stream through an opposite one of the shell side or the tube side of the isothermal HDO reactor as compared to the HDO catalyst to remove a heat of reaction between the bio-derived feedstock and the HDO catalyst, wherein the removal of the heat of reaction using the water stream forms steam; and
flowing the steam through a steam turbine to provide for the generation of renewable power.

2. The method of claim 1, comprising:
passing the steam through a steam drum and a steam superheater upstream of the steam turbine; and
recycling water separated from the steam within the steam drum back into the isothermal HDO reactor as at least a portion of the water stream.

3. The method of claim 1, comprising performing at least one of:
utilizing at least a portion of the generated renewable power as a baseload power supply for a reaction system comprising the isothermal HDO reactor; or
exporting at least a portion of the generated renewable power.

4. The method of claim 1, comprising condensing an exhaust from the steam turbine within a condenser, forming a condensed stream.

5. The method of claim 4, comprising:
increasing a pressure and a temperature of the condensed stream within a pump and a preheater, respectively, forming a high-pressure, high-temperature stream; and
recombining the high-pressure, high-temperature stream with the steam upstream of the steam turbine.

6. The method of claim 1, comprising operating the isothermal HDO reactor with an operating temperature that is in a range between 500 degrees Fahrenheit (° F.) and 1,000° F. and an operating pressure that is in a range between 300 pounds per square inch gauge (psig) and 1,200 psig.

7. The method of claim 6, comprising forming the steam with a pressure that is in a range between 50 psig and 1,500 psig.

8. The method of claim 6, comprising forming the steam with a pressure that is higher than the operating pressure of the isothermal HDO reactor.

9. The method of claim 1, comprising utilizing a plurality of isothermal HDO reactors arranged in series or in parallel, or in some combination thereof, to perform the method.

10. A hydrodeoxygenation (HDO) unit, comprising:
at least one isothermal HDO reactor comprising a shell-and-tube configuration, wherein the at least one isothermal HDO reactor is configured to produce an HDO reactor effluent via reaction between a bio-derived feedstock and an HDO catalyst residing on either a shell side or a tube side of the at least one isothermal HDO reactor, wherein a water stream flows through an opposite one of the shell side or the tube side of the isothermal HDO reactor as compared to the HDO catalyst to remove a heat of reaction between the bio-derived feedstock and the HDO catalyst, and wherein the removal of the heat of reaction via the water stream generates steam; and
a steam turbine configured to generate renewable power using the steam.

11. The HDO unit of claim 10, comprising a steam superheater configured to increase a temperature of the steam upstream of the steam turbine.

12. The HDO unit of claim 10, comprising:
a steam drum configured to separate water from the steam upstream of the steam turbine; and
a flowline configured to recycle the separated water back into the at least one isothermal HDO reactor as at least a portion of the water stream.

13. The HDO unit of claim 10, wherein the HDO unit is configured to perform at least one of:
utilizing at least a portion of the generated renewable power as a baseload power supply for the HDO unit; or
exporting at least a portion of the generated renewable power.

14. The HDO unit of claim 10, comprising a condenser to cool an exhaust from the steam turbine, forming a condensed stream.

15. The HDO unit of claim 14, comprising:
a pump and a preheater configured to increase a pressure and a temperature, respectively, of the condensed stream, forming a high-pressure, high-temperature stream; and
a flowline configured to recombine the high-pressure, high-temperature stream with the steam upstream of the steam turbine.

16. The HDO unit of claim 10, wherein the HDO unit is configured to:
extract a portion of the generated steam; and
utilize the extracted steam as at least one of a stripping steam, a reboiler heat source, or a steam source for meeting site steam balance demands.

17. The HDO unit of claim 10, wherein the at least one isothermal HDO reactor is configured to operate with an operating temperature that is in a range between 500 degrees Fahrenheit (° F.) and 1,000° F. and an operating pressure that is in a range between 700 pounds per square inch gauge (psig) and 1,000 psig.

18. The HDO unit of claim 17, wherein the at least one isothermal HDO reactor is configured to form the steam with a pressure that is in a range between 50 psig and 1,500 psig.

19. The HDO unit of claim 10, wherein the at least one isothermal HDO reactor is configured to form the steam with a pressure that is higher than the operating pressure of the at least one isothermal HDO reactor.

20. The HDO unit of claim 10, wherein the at least one isothermal HDO reactor comprises at least one of:
a plurality of isothermal HDO reactors arranged in series; or
a plurality of isothermal HDO reactors arranged in parallel.

\* \* \* \* \*